(12) United States Patent
Hiyoshi

(10) Patent No.: US 6,601,067 B1
(45) Date of Patent: Jul. 29, 2003

(54) APPARATUS FOR SORTING AND MERGING DATA RECORDS

(75) Inventor: Kiyomitsu Hiyoshi, Shizuoka (JP)

(73) Assignee: Fujitsu Limited, Kawasaki (JP)

(*) Notice: Subject to any disclaimer, the term of this patent is extended or adjusted under 35 U.S.C. 154(b) by 266 days.

(21) Appl. No.: 09/663,707

(22) Filed: Sep. 18, 2000

(30) Foreign Application Priority Data

Nov. 11, 1999 (JP) .......................................... 11-320941

(51) Int. Cl.[7] .............................................. G06F 17/30
(52) U.S. Cl. ...................... 707/7; 707/4; 707/6; 707/10
(58) Field of Search .......................... 707/2, 3, 7, 101, 707/102, 10, 104.1, 201, 533

(56) References Cited

U.S. PATENT DOCUMENTS

| | | | |
|---|---|---|---|
| 5,185,886 A | * | 2/1993 | Edem et al. ................ 395/600 |
| 5,206,947 A | * | 4/1993 | Edem et al. ................ 395/600 |
| 5,210,870 A | * | 5/1993 | Baum et al. ................ 395/600 |
| 5,537,603 A | * | 7/1996 | Baum et al. ................ 395/800 |
| 5,640,554 A | * | 6/1997 | Take ........................... 395/607 |
| 5,855,016 A | * | 12/1998 | Edem et al. .................... 707/7 |
| 5,878,410 A | * | 3/1999 | Zbikowski et al. ............ 707/2 |

* cited by examiner

Primary Examiner—Hosain T. Alam
Assistant Examiner—Jacques Veillard
(74) Attorney, Agent, or Firm—Staas & Halsey LLP

(57) ABSTRACT

A sort/merge processor which processes, with a single command, a heterogeneous collection of input files that require different processing options. Input data files are divided into groups each of which shares a common record extraction criterion, a common record reformatting rule, and common file system. A group profile identification unit accepts a sort/merge command and identifies such rules and criteria for the individual file groups by parsing group profile specifications contained in the command. Each time a specific input file group is given, a suitable processing environment is set up by an extraction criteria setting unit, a reformatting rule setting unit, and a file system setting unit. A file reading unit reads out records from input files through the specified file system. Then a record extraction processor extracts relevant records on the basis of the record extraction criterion, and a record reformatting processor reformats them according to the record reformatting rule. After that, the sort/merge execution unit sorts and merges those records. The above processing is performed for all groups, and finally, a file writing unit writes the resultant records to an output file.

4 Claims, 13 Drawing Sheets

FIG. 3(A)

| BRANCH OFFICE NAME | YEAR | MONTH | SALES |
|---|---|---|---|

FIG. 3(B)

FILE #4
FILE #3
FILE #2
FILE #1

```
A  1998  01  000005000000
A  1998  02  000004500000
A  1998  03  000001000000
A  1998  04  000003000000
A  1998  05  000000450000
A  1998  06  000000020000
A  1998  07  000001000000
A  1998  08  000006000000
A  1998  09  000005600000
A  1998  10  000000300000
A  1998  11  000000250000
A  1998  12  000000400000
```

FIRST FILE GROUP

FIG. 4(A)

| BRANCH OFFICE NAME | YEAR | MONTH | SALES |
|---|---|---|---|

FIG. 4(B)

```
                        FILE #8
                      FILE #7
                    FILE #6
                  FILE #5

A  1999  01   000005000000
        A  1999  02   000004500000
        A  1999  03   000001000000
        A  1999  04   000003000000
        A  1999  05   000000450000
        A  1999  06   000000020000
        A  1999  07   000001000000
        A  1999  08   000006000000
        A  1999  09   000005600000
        A  1999  10   000000300000
        A  1999  11   000000250000
        A  1999  12   000000400000
```

SECOND FILE GROUP

OUTPUT FILE

| BRANCH OFFICE NAME | YEAR | MONTH | SALES |
|---|---|---|---|

TWO DIGITS

FIG. 6(B)

FILE #4
FILE #3
FILE #2
FILE #1

```
A  99  01  000005000000
A  99  02  000004500000
A  99  03  000001000000
A  99  04  000003000000
A  99  05  000000450000
A  99  06  000000020000
A  99  07  000001000000
A  99  08  000006000000
A  99  09  000005600000
A  99  10  000000300000
A  99  11  000000250000
A  99  12  000000400000
```

FIRST FILE GROUP

FIG. 7(A)

| BRANCH OFFICE NAME | YEAR | MONTH | SALES |
|---|---|---|---|

FOUR DIGITS

FIG. 7(B)

```
                    FILE #8
                  FILE #7
                FILE #6
              FILE #5

A  2000  01  000005000000
    A  2000  02  000004500000
    A  2000  03  000001000000
    A  2000  04  000003000000
    A  2000  05  000000450000
    A  2000  06  000000020000
    A  2000  07  000001000000
    A  2000  08  000006000000
    A  2000  09  000005600000
    A  2000  10  000000300000
    A  2000  11  000000250000
    A  2000  12  000000400000
```

SECOND FILE GROUP

OUTPUT FILE

FIRST STAGE

SECOND STAGE

THIRD STAGE

APPARATUS FOR SORTING AND MERGING DATA RECORDS

BACKGROUND OF THE INVENTION

1. Field of the Invention

The present invention generally relates to sort/merge processors. More particularly, the present invention relates to an apparatus which executes sorting and merging data records, satisfying both given record extraction criteria and specified record reformatting rules at the same time, as well as being applicable to a wide range of file handling programs including sort or merge operations.

2. Description of the Related Art

Today's computerized business activities, such as the operations of financial online systems, involve daily data collection and processing tasks. The collected data records are subjected to various processes, including filtering, sorting, and reformatting, under predetermined processing rules. Usually, those routine tasks are accomplished through the use of so-called sort/merge programs. Conventionally, this kind of sort/merge programs provide such functions as extraction and reformatting of records, besides supporting various file systems. The program processes each input file with some specific conditions suitable for that file.

FIG. 12 is a flowchart showing a process flow of conventional sort/merge programs. This process first chooses an appropriate file system that is suitable for input files to be processed (step S1). Then source data is read out of the input files through the selected file system (step S2). Relevant records are extracted according to some given record extraction criteria (step S3), and reformatted as specified in a predetermined record reformatting rule (step S4). This step S4 may be skipped when no record reformatting rules are specified. The extracted and reformatted records are subjected to sort and merge processing (step S5). The above steps S2 to S5 are repeated until all input files are processed and the End of Data (EOD) is indicated. Lastly, the resultant records are written into an output file (step S6).

A more specific example process will now be explained below, assuming that two input files are to be sorted and merged on different file systems and record extraction criteria. FIGS. 13(A) to 13(C) show three processing stages of a conventional sort/merge process. Suppose here that the two input files 1 and 2 have the following requirements. The first input file 1 needs a file system that handles a standard file format, and sort/merge operations should be performed under a first record extraction criterion. The second input file 2, on the other hand, requires another file system that can handle the Common Business Oriented Language (COBOL) index file format. Sort/merge operations should be performed under a second record extraction criterion. With those conditions and rules, the processor sorts and merges the two files in the following way.

Referring to FIG. 13(A), the first stage is shown. As explained in the flowchart of FIG. 12, the processor reads the first input file 1 through the standard file system, extracts relevant records that meet the first record extraction criterion, sorts the extracted records, and saves them into a first intermediate file 3. Referring next to FIG. 13(B), the second stage proceeds similarly to the first stage. That is, the processor reads the second input file 2 through the COBOL index file system, extracts relevant records that meet the second record extraction criterion, sorts the extracted records, and saves them into a second intermediate file 4. The above first and second intermediate files 3 and 4 are created in the standard file format. Referring to FIG. 13(C), the third stage is shown. The processor reads out records from the first and second intermediate files 3 and 4, sorts and merges all the records, and write them into an output file 5.

As seen from the above, the conventional sort/merge processor has to process data files individually at separate job stages and then merge the results, because they require different file systems and different record extraction criteria. Such job stages are executed by giving appropriate commands to the sort/merge processor. For example, the command script used in the three stages shown in FIGS. 13(A) to 13(C) is as follows.

```
;Stage 1
bsort -s infile1 -o intermediatefile1
      -p 10.4asc.eq.'test' -z 100
;Stage 2
bsort -s infile2 -o intermediatefile2
      -p 20.4asc.eq.'test' -z 100 -F dosfs, cobidx
;Stage 3
bsort -m intermediatefile1 intermediatefile2
      -o outfile -z 100
```

Here, "bsort" is a command to execute sort/merge processing, which is followed by some command options each beginning with a minus sign ("-"). The options include: "-s" (sort switch), "-m" (merge switch), "-o" (output file name), "-p" (record extraction switch), "-z" (record length), and "-F" (output file system and input file system).

More specifically, the above commands specify the following things. The first stage command requests the processor to read the first input file 1 ("infile1") using the default file system, extract records, and sort them into a first intermediate file 3 ("intermediatefile1"). When extracting relevant records, the processor is to search for such records that contain a 4-byte ASCII character string "test" starting at the eleventh byte (i.e., byte #10). At the second stage, a different record extraction criterion is specified. In addition, the processor is requested to use the standard disk operating system (DOS) file system ("dosfs") when writing an output file, and the COBOL index file system ("cobidx") when reading input files. The third stage command requests the processor to read the two intermediate files 3 and 4 ("intermediatefile1," "intermediatefile2"), merge them together, and write the result in to an output file 5 ("outfile").

As seen from the above example command script, the conventional sort/merge processor requires the user to add a new job step each time he/she encounters a different kind of input files in terms of source file systems, record extraction criteria, and record reformatting rules. This means that the processor must execute sorting and merging as many times as the number of different conditions, causing a problem of low processing efficiency.

SUMMARY OF THE INVENTION

Taking the above into consideration, an object of the present invention is to provide a sort/merge processing apparatus which accepts at a time a variety of processing options for multiple input files, including different record extraction criteria, different record reformatting rules, and different file system designations.

To accomplish the above object, according to the present invention, there is provided an apparatus for sorting and merging records contained in a plurality of input files in accordance with predefined conditions. This apparatus comprises the following elements: a group profile identification unit which accepts a command containing group profile specifications, and identifies record extraction criteria for individual groups of input files by parsing the group profile specifications contained in the command; an extraction criteria setting unit which sets up one of the identified record extraction criteria that is required to process input files belonging to a specific group; a file reading unit which reads out records from the input files; a record extraction processor which extracts, out of the records read out from the input files, such records that are relevant to the record extraction criterion set up by the extraction criteria setting unit; a sort/merge execution unit which executes a sort/merge operation to the extracted records; and a file writing unit which writes the sorted and/or merged records to an output file.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3(A) shows a record format of a first file group;

FIG. 3(B) shows example records of the first file group;

FIG. 4(A) shows a record format of a second file group;

FIG. 4(B) shows example records of the second file group;

FIG. 5 shows the result of sort/merge processing;

FIG. 6(A) shows another record format of the first file group;

FIG. 6(B) shows example records of the first file group;

FIG. 7(A) shows another record format of the second file group;

FIG. 7(B) shows example records of the second file group;

Figure 8:
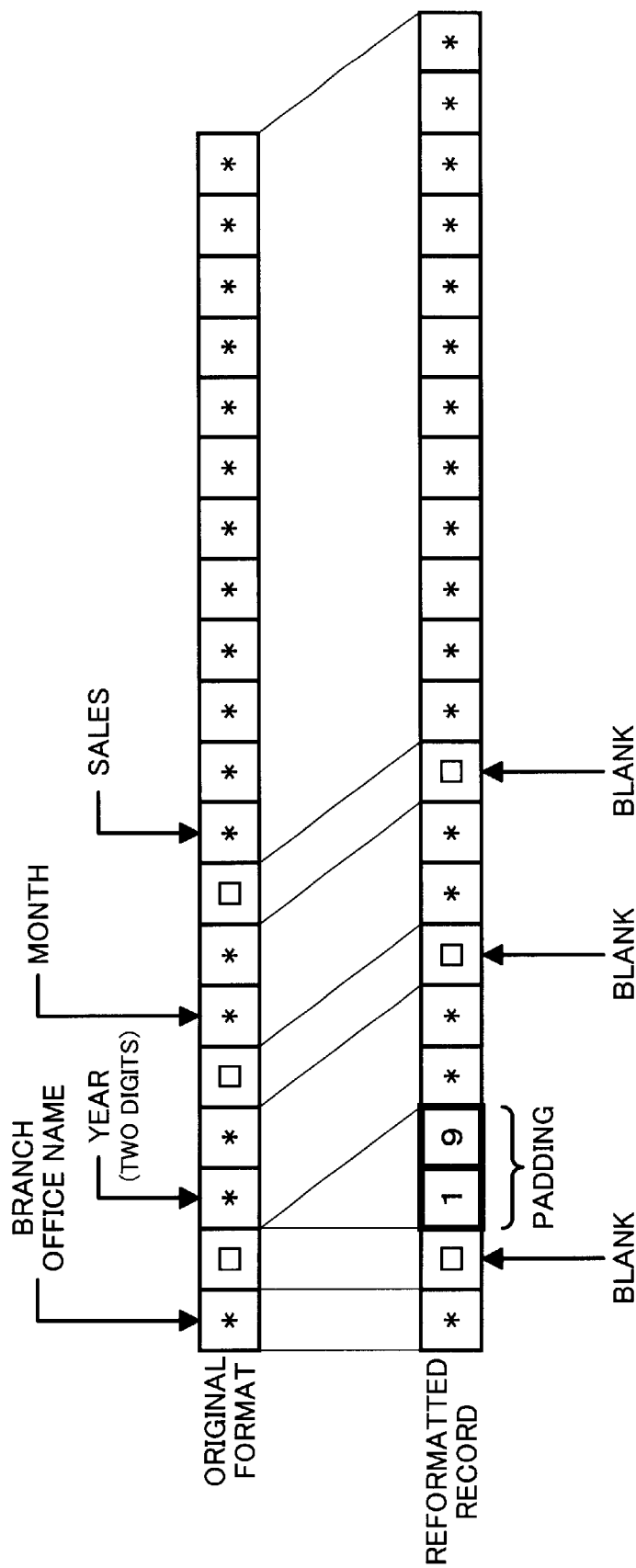
Figure 10:
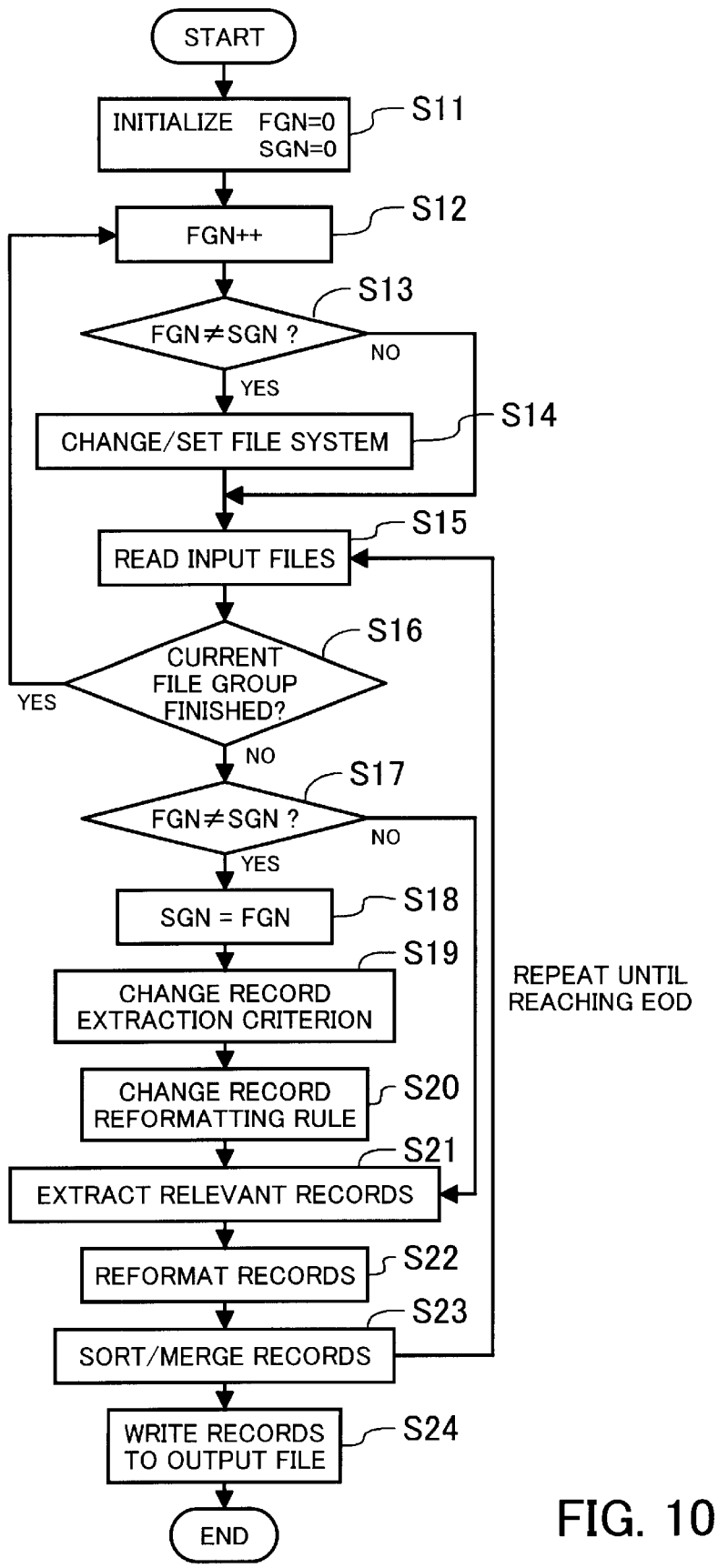
Figure 11:
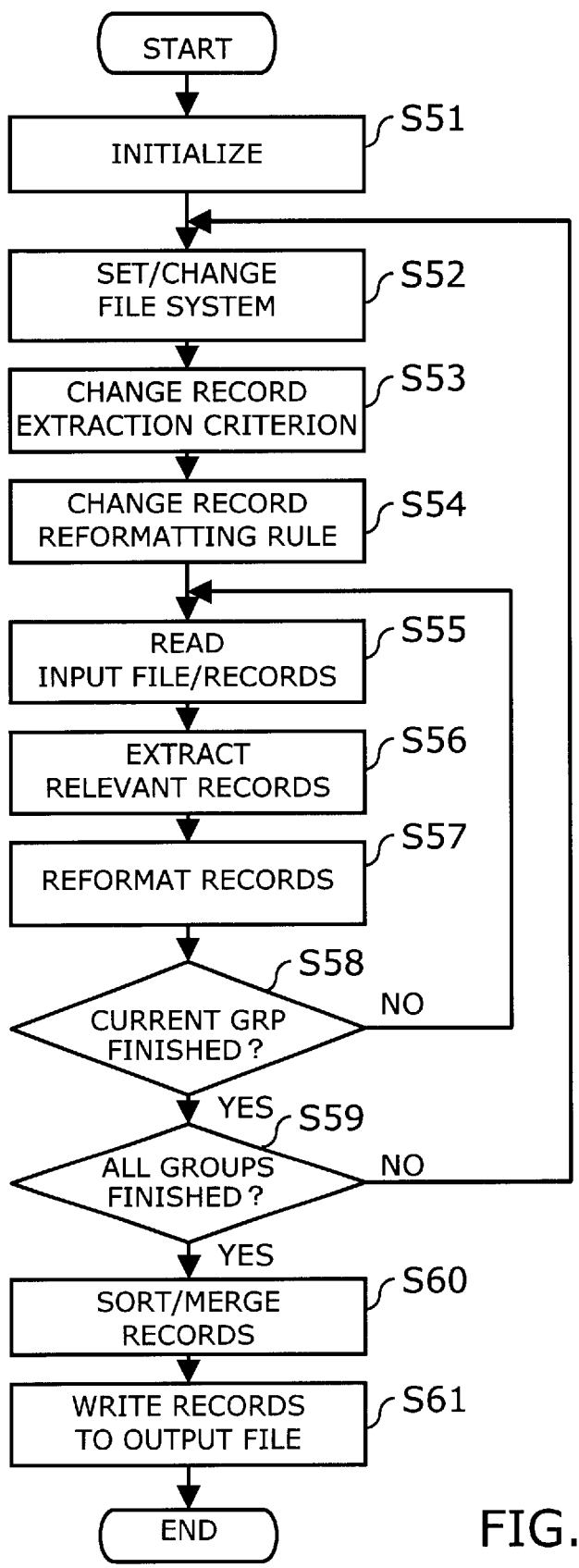
Figure 12:
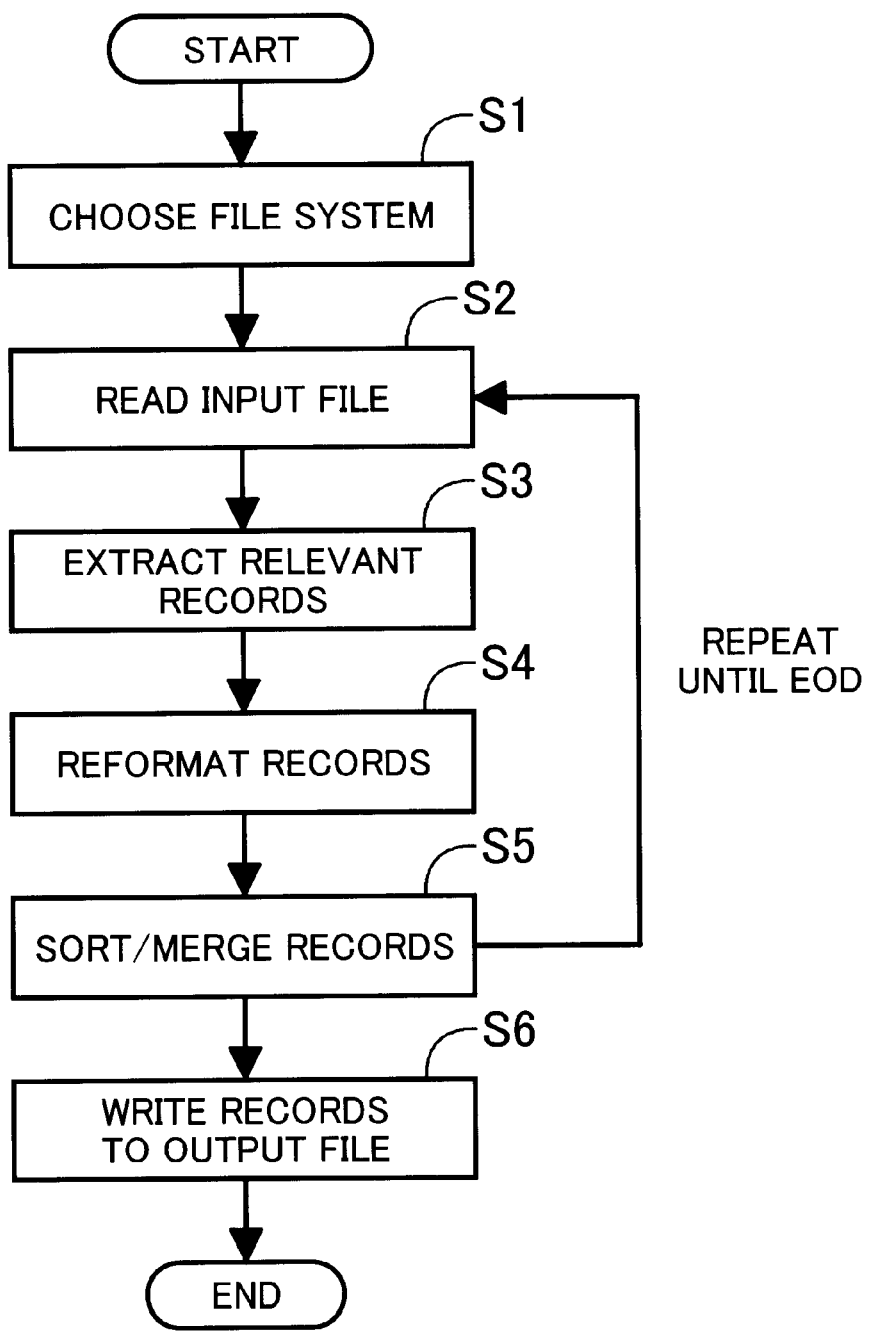
Figure 13A:
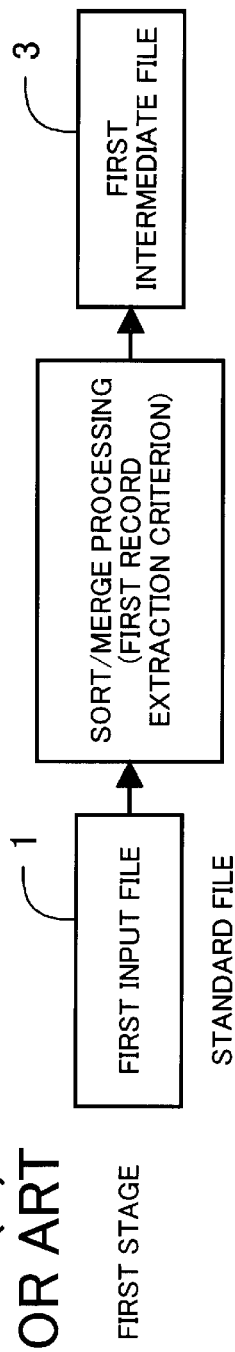
Figure 13B:
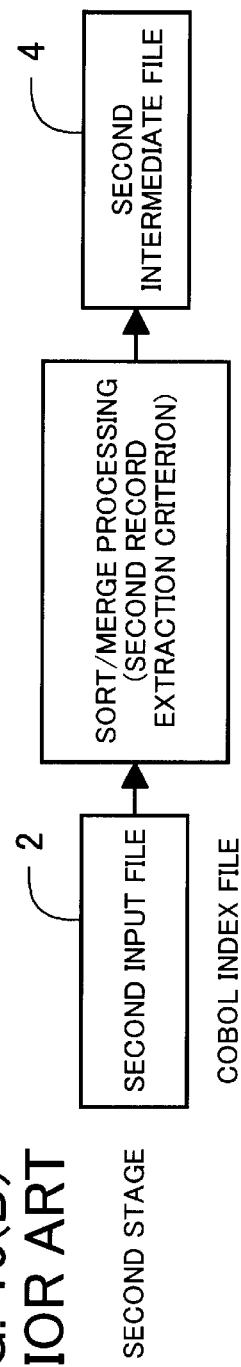
Figure 13C:
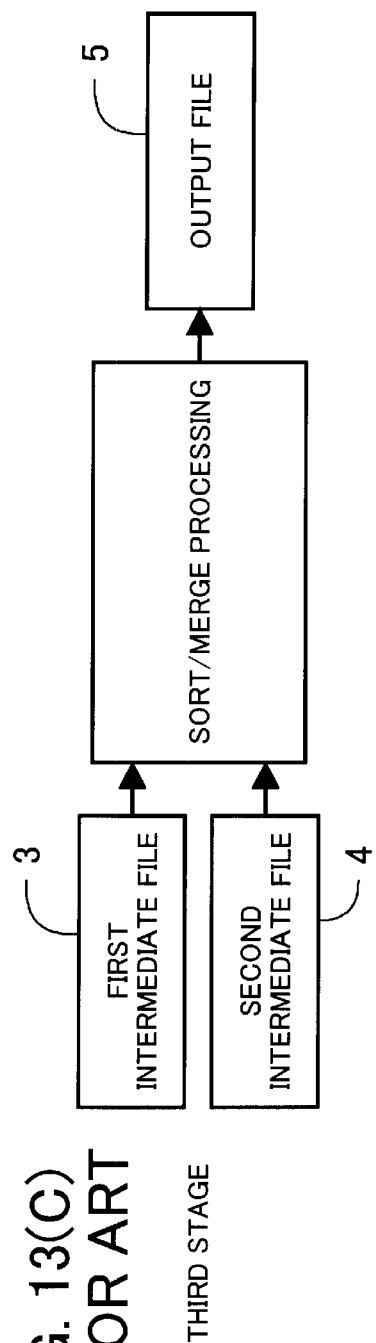

The FIG. 8 is a diagram which explains how to reformat a record;

FIG. 9 shows the result of sort/merge processing;

FIG. 10 is a flowchart of a sort/merge program according to the present invention;

FIG. 11 is a flowchart of another sort/merge program according to the present invention;

FIG. 12 is a flowchart which shows a process flow of a conventional sort/merge process; and FIGS. 13(A), 13(B), and 13(C) show a first, second, and third stages of the conventional sort/merge process, respectively.

DESCRIPTION OF THE PREFERRED EMBODIMENTS

Preferred embodiments of the present invention will be described below with reference to the accompanying drawings.

Figure 1:
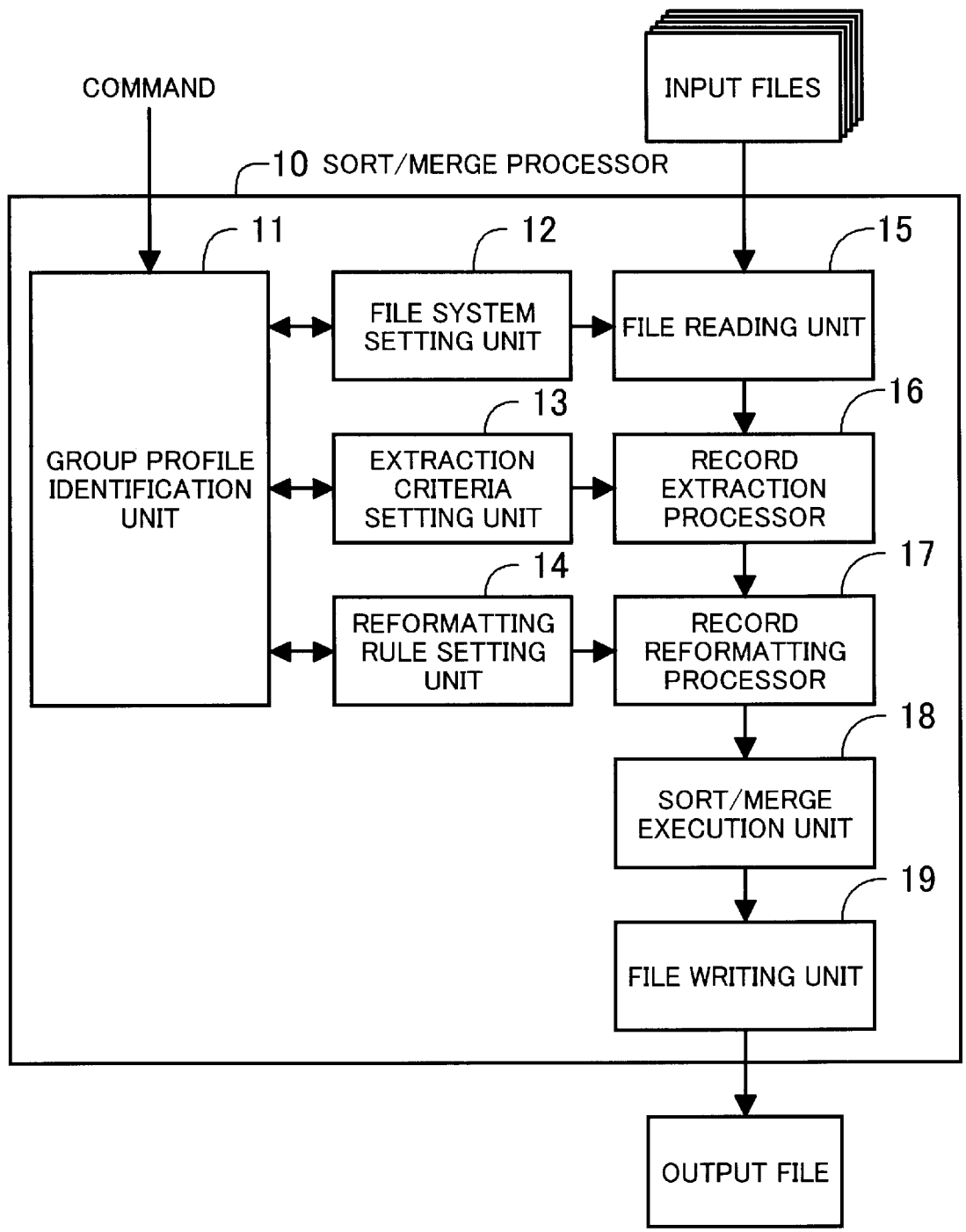
FIG. 1 is a block diagram showing the basic structure of a sort/merge processor according to the present invention.

Referring first to FIG. 1, the concept of the present invention will be explained. FIG. 1 is a block diagram of a sort/merge processor according to the present invention. This sort/merge processor 10 comprises the following elements: a group profile identification unit 11, a file system setting unit 12, an extraction criteria setting unit 13, a reformatting rule setting unit 14, a file reading unit 15, a record extraction processor 16, a record reformatting processor 17, a sort/merge execution unit 18, and a file writing unit 19.

Briefly, the functions of the above elements are as follows. The group profile identification unit 11 accepts sort and merge commands. The file system setting unit 12 sets up a required file system. The extraction criteria setting unit 13 sets up a required record extraction criterion. The reformatting rule setting unit 14 sets up a required record reformatting rule. The file reading unit 15 reads data records from given input files. The record extraction processor 16 extracts relevant records according to the record extraction criterion. The record reformatting processor 17 reformats the extracted records according to the record reformatting rule. The sort/merge execution unit 18 sorts and merges the records. The file writing unit 19 writes the resultant records into an output file.

The proposed processor 10 receives a sort/merge command. According to the present invention, this command contains group profile specifications that describe each group of input files. By definition, each file group shares the same record extraction criterion, the same record reformatting rule, and the same source file system; the group profile specifications provide those pieces of information. Parsing the group profile specifications, the group profile identification unit 11 determines which operating parameters (i.e., file system, record extraction criterion, and record reformatting rule) should be used to process each group of input files. When processing a specific file group, the environment for that group has to be established with the operating parameters determined by the group profile identification unit 11. To do this, the file system setting unit 12 sets up the required file system; the extraction criteria setting unit 13 sets up the required record extraction criterion; the reformatting rule setting unit 14 sets up the required record reformatting rule.

Now that the processing environment has been established, the file reading unit 15 reads input files from the specified file system. Then the record extraction processor 16 and record reformatting processor 17 perform extraction and reformatting of the records, based on the given record extraction criterion and record reformatting rule. After that, the sort/merge execution unit 18 sorts and merges the records. The foregoing is applied uniformly to every input file belonging to the same group. When there is another group of input files to be processed, a new processing environment should be set up, including a new file system, a new record extraction criterion, and a new record reformatting rule, where appropriate. With this new setup, the next group of input files is processed. When all groups are done in this way, the file writing unit 19 saves the resultant records into an output file.

The following is an example of sort/merge command according to the present invention. This command is intended for the same sort/merge operation as the conventional command script described in an earlier part of the description.

```
bsortex -sort
    -input file=infile1 include=10.4asc.eq.'test'
        reclen=100
```

```
-input file=infile2 include=20.4asc.eq.'test'
    reclen=100 filesys=cobidx
-output file=output3 -record recform=fix
```

Here, "bsortex" is a command to execute sort/merge processing, which is followed by some command options each beginning with a minus sign ("–"). The options and their arguments include: "–sort" (sort switch), "–input" (input file group), "file=" (file name), "include=" (record extraction criterion), "reclen=" (record length), "–output" (output file group), "–record recform=" (record format specification), and "filesys=" (file system specification).

As the above example shows, the proposed sort/merge processor is designed to handle a file group consisting of a plurality of input files that share the same processing environment. Since it can even process two or more different file groups in a single operation, the proposed processor offers increased efficiency in sorting and merging a heterogeneous collection of input files.

The following section will now present a sort/merge program as a specific embodiment of the present invention.

Figure 2:
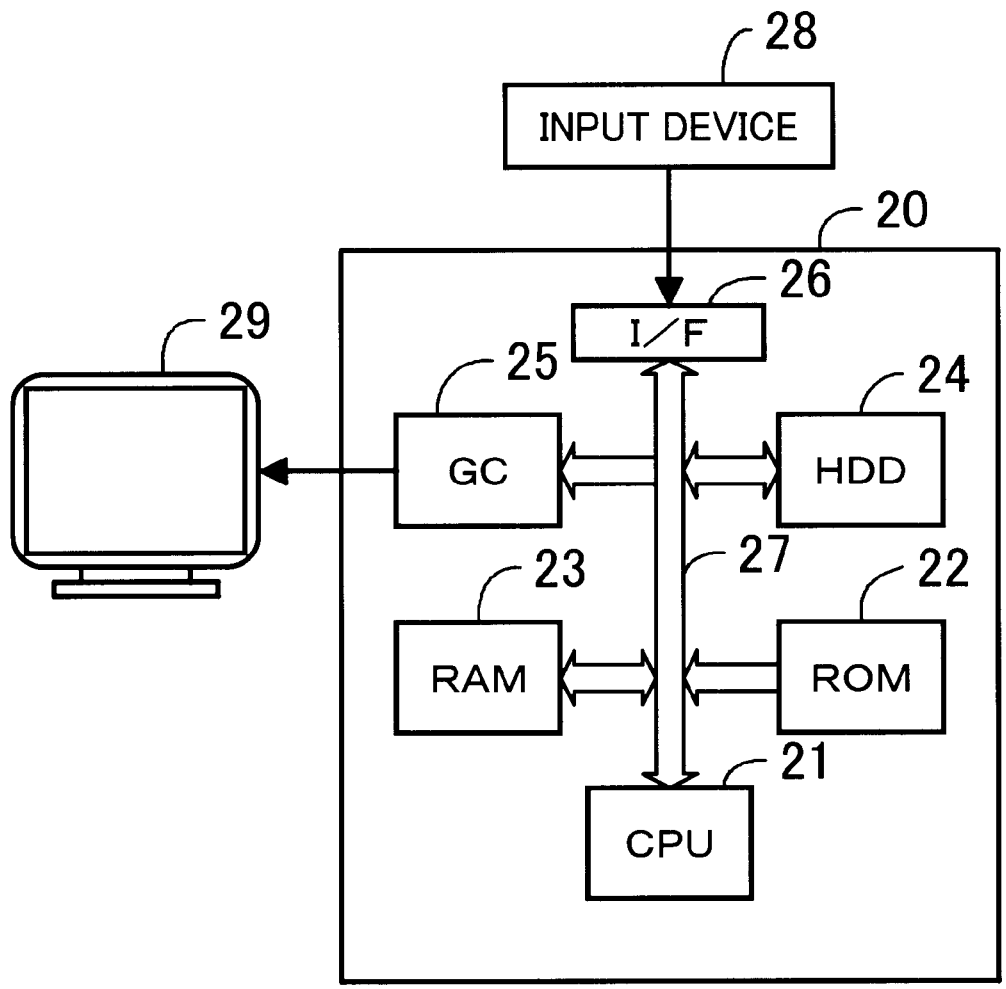
FIG. 2 is a block diagram of a typical computer platform on which the proposed sort/merge program is to run.

The sort/merge program runs on a computer platform as shown in a block diagram of FIG. 2. This computer 20 comprises the following components: a central processing unit (CPU) 21, a read-only memory (ROM) 22, a main memory (RAM) 23, a hard disk drive (HDD) 24, a graphics controller (GC) 25, and an interface (I/F) 26. These components are interconnected by a bus 27. Input devices 28 such as a keyboard and mouse are connected to the interface 26, and a monitor unit 29 is coupled to the graphics controller 25.

The sort/merge program and input files are stored in the hard disk drive 24. Output files will also be stored there. The sort/merge program is executed by the central processing unit 21 after being loaded from the hard disk drive 24 to the main memory 23. The program execution is invoked by a sort/merge command that the user enters through the input devices 28.

The sort/merge program can handle input files with different record extraction criteria. Referring next to FIGS. 3 to 5, a specific example of sort/merge processing will be described below. It is assumed here that there are a plurality of lists containing sales records achieved at four branch offices A to D in 1998 and 1999, and that the project objective is to create a list of sales achievement in the fiscal year of 1998 (i.e., April 1998 to March 1999 in this example). Based on the difference in their record extraction criteria, the input files are divided into two groups. The first file group contains sales records in 1998, and the second file group contains those in 1999.

FIGS. 3(A) and 3(B) illustrate the record format and example records of the first file group. FIGS. 4(A) and 4(B) illustrate the record format and example records of the second file group. The first file group consists of four files #1 to #4, which contain monthly sales in the year of 1998 recorded at the branch offices A to D, respectively. As FIG. 3(A) shows, each record has the following four data fields, or columns: "Branch Office Name," "Year," "Month," and "Sales." In the input files, these four columns are separated by a blank code. Take the first record in the file #1 for example. This record indicates that the branch office A achieved the sales of 500,000 dollars in the month of 1998-01 (i.e., January 1998). The input file #1 is a collection of records of this kind.

The second file group is structured in a similar manner, as shown in FIG. 4(B). It consists of four files #5 to #8, which respectively contain the sales records of four branch offices A to D during the period of 1999-01 to 1999-12. The record format of the second group is shown in FIG. 4(A), which is the same as that of the first group.

In order to create a sales record list for the fiscal year of 1998 (i.e., 1998-04 to 1999-03), the record extraction criterion for the first file group is defined as "04"≦"Month"≦"12"

and the same for the second file group is

"01"≦"Month"≦"03"

In addition, the sort parameters have be set so that the sales records will be rearranged in the ascending order with respect to the sort keys of "Branch Office Name," "Year," and "Month" with successively lower priorities.

With the above-described setup, the sort/merge program yields a resultant output file shown in FIG. 5. This output file shows the sales achievement during the period of April 1998 to March 1999, arranged in the order of "Branch Office Name." The command used in that sort/merge processing is as follows.

```
bsortex -sort
  -input reclen=22 file=file1, file2, file3, file4
      include=7.2asc.ge.'04'.and.7.2asc.le.'12'
  -input reclen=22 file=file5, file6, file7, file8
      include=7.2asc.ge.'01'.and.7.2asc.le.'03'
  -output file=output -record recform=fix
```

Here, the first instance of "–input" option statement specifies a record extraction criterion to be applied to the first file group. Specifically, the expression 7.2asc.ge.'04'.and.7.2asc.le.'12' is evaluated as "true" when the following two logical conditions are both satisfied: (1) the two-byte ASCII field star ting at the eighth byte (i.e., byte #7) has a numerical value equal to or greater than four; and (2) the same field value is equal to or smaller than twelve. In other words, a record is extracted when its "Month" data falls within a range between "04" (April) and "12" (December). Likewise, the second instance of "–input" option specifies the record extraction criterion for the second file group. The expression 7.2asc.ge.'01'.and.7.2asc.le.'03' means that a record is extracted when its "Month" data falls within a range between "01" (January) and "03" (March). Although there is no explicit designation of sort keys, the sort/merge program treats the fields of "Branch Office Name," "Year," and "Month" as the default sort keys with successively lower priorities.

Compare the above command with the following script, which would be used in the conventional processor to do the same sort/merge operation.

```
;Sort First Group
bsort -s file1 file2 file3 file4 -6 intermediatefile1
    -p 7.2asc.ge.'04' -p 7.2asc.le.'12' –0.1asca,
    2.4asca, 7.2asca -z 22
;Sort Second Group
bsort -s file5 file6 file7 file8 -o intermediatefile2
    -p 7.2asc.ge.'01' -p 7.2asc.le.'03' –0.1asca,
    2.4asca, 7.2asca -z 22
```

-continued

```
;Merge Intermediate Files
   bsort -m intermediatefile1 intermediatefile2
          -o outfile -0.1asca, 2.4asca, 7.2asca -z 22
```

Here, the parameters "−0.1asca, 2.4asca, 7.2asca" provide the sort key definitions, requesting that the records be sorted in the ascending order with respect to the sort keys of "Branch Office Name," "Year," and "Month" with successively lower priorities.

The proposed sort/merge program can handle input files with different record formats, in addition to different record extraction criteria. Referring next to FIGS. 6 to 8, a specific example of this kind of processing will be described below. Similarly to the preceding case, there are a plurality of lists containing sales records of four branch offices A to D in 1999 and 2000, and that the project objective is to create a list of sales in the 1999 fiscal year. The first file group contains sales records in 1999, and the second file group contains those in 2000. Unlike the preceding case, the first file group differs from the second file group in that its "Year" data field is two-digit long. (It is four digits in the second file group.)

FIGS. 6(A) and 6(B) illustrate the record format and example records of the first file group. Likewise, FIGS. 7(A) and 7(B) illustrate the record format and example records of the second file group. The first file group consists of four files #1 to #4, which show the 1999 sales achievement of four branch offices A to D, respectively. Notice that the "Year" data field length is two digits as indicated in FIG. 6(A). The second file group, on the other hand, consists of four files #5 to #8 showing the 2000 sales achievement of the four branch offices A to D, respectively. Note again that the "Year" field length is four digits as indicated in FIG. 7(A).

In order to create a sales record list for the fiscal year of 1999 (i.e., 1999-04 to 2000-03), the record extraction criterion for the first file group should be set as follows:

04≦Month≦12

Further, the record reformatting rule of the first file group should be set as follows:

Branch Office Name, Blank, 19, Year, Blank, Month, Blank, Sales

The first file group needs reformatting because it is different from the second group in the position and length of "Year" data field. To solve this discrepancy, the sort/merge program reforms every record of the first file group by inserting a two-digit padding code "19" before the two-digit "Year" field, as shown in FIG. 8. The resulting first group records will have the same data alignment as those in the second file group.

Regarding the second file group, the following record extraction criterion is applied.

01≦Month≦03

In addition, appropriate parameters should be set so that the sales records will be rearranged in the ascending order with reference to the sort keys of "Branch Office Name," "Year," and "Month" with successively lower priorities.

With the above setup, the proposed sort/merge program yields a resultant output file shown in FIG. 9. This output file shows the combined sales records during the period of April 1999 to March 2000, sorted primarily in the order of "Branch Office Name." The command used in that sort/merge processing is as follows.

```
bsortex -sort
   -input reclen=22 file=file1, file2, file3, file4
          include=7.2asc.ge. '04'.and.7.2asc.le.'12'
          reconst=0.2, '19'.2asc, 2.18
   -input reclen=22 file=file5, file6, file7, file8
          include=7.2asc.ge.'01'.and.7.2asc.le.'03'
   -output file=output -record recform=fix
```

Here, the first instance of "−input" option includes an expression "reconst=0.2, '19'.2asc, 2.18" to specify how to reconstruct each record in the first file group. This expression is interpreted as follows. At the outset, the first two bytes of the original record is copied. Next, a two-byte long ASCII string "19" is padded. Lastly, the remaining bytes of the original record (i.e., 18 bytes starting from byte #2) follow the padding.

Compare the above command with the following script, which would be used in the conventional processor to do the same sort/merge operation.

```
;Sort First Group
   bsort -s file1 file2 file3 file4 -o intermediatefile1
          -p 5.2asc.ge.'04' -p 5.2asc.le.':12' −0.1asca,
          2.4asca, 7.2asca -e 0.2, '19'.2asc, 2.18 -z 22
;Sort Second Group
   bsort -s file5 file6 file7 file8 -o intermediatefile2
          -p 7.2asc.ge.'01' -p 7.2asc.le.'03' −0.1asca,
          2.4asca, 7.2asca -z 22
;Merge Intermediate Files
   bsort -m intermediatefile1 intermediatefile2
          -o outfile −0.1asca, 2.4asca, 7.2asca -z 22
```

Here, the option "−e 0.2, '19'.2asc, 2.18" is equivalent to what has been explained earlier as the "reconst" option.

Referring next to FIGS. 10 and 11, the following sections will provide a few examples of how the present invention is embodied in the form of software programs.

FIG. 10 is a flowchart of a proposed sort/merge program. This flowchart starts with the process initialization (step S11), in which file group number (FGN) and save group number (SGN) are both set to zero. The file group number is then incremented (step S12). Now it is tested whether the file group number is unequal to the save group number (step S13). This test yields a result of "true" (YES) the first time after the initialization, or when the file group is changed. If this is the case, the file system is changed or set to what the current file group requires (step S14). This step S14 is skipped while the same file group is processed, because, by definition, the file system is consistent within each specific file group.

Through the specified file system, an input file in the current file group is read out in whole or part, and loaded to the memory (step S15). If the current file group has already been exhausted, then the step S15 fails to read records. In this case, the process returns to step S12 to meet the next group (step S16). Otherwise, the process advances to the next step to manipulate the records that have been loaded at step S15. Recall the case of FIGS. 6(B) and 7(B) described earlier, and suppose, for example, that the first four files #1 to #4 were finished and the file #5 has just been read out of the hard disk drive. Since the current file group has been finished, the process returns to step S12 to migrate to the next file group. If the current file group is still in process, it is then determined whether the file group number is unequal to the save group number (step S17). This test yields a result of "true" the first time after the initialization, or when the file group is changed. If this is the case, the file group number is substituted for the save group number (step S18); new record extraction criteria are applied, if any (step S19); new record reformatting rules are applied, if any (step S20). If the file group number agrees with the save group number at step S17, the steps S18 to S20 are skipped.

Next, a set of records that meet the given record extraction criterion are extracted (step S21), and they are reformatted according to the given record reformatting rule (step S22). With the specified sort keys, the extracted and reformatted records are sorted and merged (step S23). The above steps S15 to S23 are repeated until all the input files are finished. When the end of data (EOD) is reached, the processor writes the result into an output file (step S24).

Note that above-described sort/merge program is designed to sort and merge the extracted and reformatted records each time a new input file or new records are loaded to the memory. This configuration is suitable for such cases where the volume of each input file or file group is relatively large, compared to the memory capacity of a computer system being used. If the memory is large enough to read all input records, it will be possible to sort and merge the records all at once. The next section will describe another sort/merge program which is designed for such a case.

FIG. 11 is a flowchart of another proposed sort/merge program, which is applicable when the main memory is large enough to load all input records. This flowchart starts with the process initialization (step S51). The file system to be used to load input records is then set or changed to what is required by the current file group (step S52). Subsequently, the record extraction criterion and record reformatting rule are loaded (steps S53 and S54). Through the file system established above, all or part of an input file is read into the computer's memory space (step S55). Next, a set of records that meet the current record extraction criterion are extracted (step S56), and they are reformatted according to the current record reformatting rule as required (step S57). It is then tested whether the current file group has been finished (step S58). If not, the process returns to step 55 to read more records in the same file group.

When the test condition of step S58 is "true," the process advances to the next test, where it is determined whether all the file groups have been finished (step S59). If not finished yet, the process returns to step S52 to set up a new file system, a new record extraction criterion, and a new record reformatting rule (if appropriate). When the test condition of step S59 is "true," the process advances to the final stage. Here, the extracted and reformatted records in the memory are sorted and merged all at once (step S60), and the resultant records are written into an output file (step S61).

The proposed sort/merge programs may be stored in a computer-readable medium, such as magnetic storage, optical discs, and solid state memory devices. Portable storage media, including CD-ROMs and floppy disks, are suitable particularly for circulation purposes. Further, it will be possible to store the program in an external storage unit of a server computer deployed on a network. In this case, client computers may download the program from this server through the network. The program file delivered to a user is normally installed in his/her computer's hard drive or other local mass storage devices. The computer executes the program after loading it to the main memory.

The above discussion is summarized as follows. According to the present invention, input data files are divided into groups each of which shares a common file system, a common record extraction criterion, and a common record reformatting rule, so that the sort/merge operation will be performed group by group. The proposed processing mechanism permits a heterogeneous collection of input files to be processed with a single sort/merge command, thus liberating the user from tasks of writing a complicated batch job script. The process can be finished in a shorter time, with a reduced number of steps. Such process simplifications improve the operability and maintainability of a data processing system. The proposed mechanism also provides higher system throughput because its less frequent calling of sort/merge routines. In addition, it produces no intermediate files during a sort/merge process, thus consuming smaller amounts of disk storage space.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for sorting and merging records contained in a plurality of input files in accordance with predefined conditions, comprising:

group profile identification means for accepting a command containing file group profile specifications, and identifying record extraction criteria for individual groups of input files by parsing the file group profile specifications contained in the command, the file group profile specifications including the record extraction criteria that are different from group to group;

extraction criteria setting means for setting up one of the identified record extraction criteria that is required to process input files belonging to a specific group;

file reading means for reading records from the input files;

record extraction processing means for extracting, out of the records read out from the input files, such records that are relevant to the record extraction criterion set up by said extraction criteria setting means;

sort/merge execution means for executing a sort/merge operation to the extracted records; and file writing means for writing the sorted and/or merged records to an output file.

2. The apparatus according to claim 1, wherein:

the file group profile identification means further identifies record reformatting rules for the individual groups of input files by parsing the file group profile specifications contained in the command; and the apparatus further comprises:

reformatting rule setting means for setting up one of the identified record reformatting rules that is required to process the input files belonging to the specific group, and record reformatting means for reformatting the records read out of the input files in accordance with the record reformatting rule set by said reformatting rule setting means, thereby allowing said sort/merge execution means to sort and/or merge the reformatted records.

3. The apparatus according to claim 2, wherein:

the file group profile identification means further identifies file systems that the individual groups of input files require, by parsing the file group profile specifications contained in the command; and the apparatus further comprises file system setting means for setting up one of the identified file systems that is required to process the input files belonging to the specific group.

4. A computer-readable medium storing a sort/merge program which is designed to cause a computer system to function as:

group profile identification means for accepting a command containing file group profile specifications, and identifying record extraction criteria, record reformatting rules, and file systems for individual groups of input files by parsing the file group profile specifications contained in the command, the file group profile specifications including the record extraction criteria that are different from group to group;

file system setting means for setting up one of the identified file systems that is required to process input files belonging to a specific group;

extraction criteria setting means for setting up one of the identified record extraction criteria that is required to process the input files belonging to the specific group;

reformatting rule setting means for setting up one of the identified record reformatting rules that is required to process the input files belonging to the specific group;

file reading means for reading records from the input files through the file system set up by said file system setting means;

record extraction processing means for extracting such records that are relevant to the record extraction criterion set up by said extraction criteria setting means;

record reformatting means for reformatting the records in accordance with the record reformatting rule set up by said reformatting rule setting means;

sort/merge execution means for executing a sort/merge operation on the extracted and/or reformatted records; and file writing means for writing the sorted and/or merged records to an output file.

* * * * *